United States Patent
Blaikie, III et al.

(10) Patent No.: US 11,593,515 B2
(45) Date of Patent: Feb. 28, 2023

(54) PLATFORM FOR MANAGEMENT OF USER DATA

(71) Applicant: Data Vault Holdings, Inc., New York, NY (US)

(72) Inventors: Alfred Blair Blaikie, III, Tinton Falls, NJ (US); Nathaniel T. Bradley, Tucson, AZ (US); Joshua S. Paugh, Tucson, AZ (US)

(73) Assignee: DATA VAULT HOLDINGS, INC., New York, NY (US)

( * ) Notice: Subject to any disclaimer, the term of this patent is extended or adjusted under 35 U.S.C. 154(b) by 90 days.

(21) Appl. No.: 17/039,591

(22) Filed: Sep. 30, 2020

(65) Prior Publication Data
US 2021/0097198 A1  Apr. 1, 2021

Related U.S. Application Data

(60) Provisional application No. 62/908,252, filed on Sep. 30, 2019.

(51) Int. Cl.
| | | |
|---|---|---|
| *G06F 21/00* | (2013.01) | |
| *G06F 21/62* | (2013.01) | |
| *G06Q 20/12* | (2012.01) | |
| *G06F 21/60* | (2013.01) | |
| *H04L 9/06* | (2006.01) | |
| *H04L 9/00* | (2022.01) | |

(52) U.S. Cl.
CPC ........ *G06F 21/6245* (2013.01); *G06F 21/602* (2013.01); *G06F 21/604* (2013.01); *G06Q 20/123* (2013.01); *H04L 9/0618* (2013.01); *H04L 9/50* (2022.05)

(58) Field of Classification Search
None
See application file for complete search history.

(56) References Cited

U.S. PATENT DOCUMENTS

| | | |
|---|---|---|
| 10,114,969 B1 | 10/2018 | Chaney et al. |
| 10,163,129 B1 | 12/2018 | Agarwal et al. |
| 2007/0288312 A1 | 12/2007 | Wang |
| 2012/0323718 A1* | 12/2012 | Shkedi ............... G06F 16/9535 705/26.1 |
| 2017/0011460 A1* | 1/2017 | Molinari ............. H04L 63/0823 |
| 2017/0214522 A1 | 7/2017 | Code et al. |
| 2018/0101771 A1* | 4/2018 | Schwarm ............... G06Q 10/10 |

(Continued)

FOREIGN PATENT DOCUMENTS

| | | |
|---|---|---|
| WO | 2017190175 A1 | 11/2017 |
| WO | 2019099335 A1 | 5/2019 |

OTHER PUBLICATIONS

International Preliminary Report, PCT/US2019/059920, dated May 20, 2021, 8 pages.

*Primary Examiner* — Andrew J Steinle
(74) *Attorney, Agent, or Firm* — Goodhue, Coleman & Owens, P.C.

(57) ABSTRACT

A system, method, device, and platform for managing data. Data associated with a user received from one of a number of sources. The data is automatically confirmed as applicable to a user. The data is added to a data set associated with the user. A determination is made whether the data set is complete after adding the data to the data set. One or more tokens are created based on the data set of the user.

20 Claims, 8 Drawing Sheets

(56) References Cited

U.S. PATENT DOCUMENTS

| | | | |
|---|---|---|---|
| 2018/0218456 A1* | 8/2018 | Kolb | .................... H04L 9/0637 |
| 2018/0225693 A1 | 8/2018 | Postrel | |
| 2018/0351949 A1 | 12/2018 | Scott et al. | |
| 2019/0019208 A1 | 1/2019 | Postrel | |
| 2019/0019218 A1 | 1/2019 | Thompson et al. | |
| 2019/0043050 A1 | 2/2019 | Smith et al. | |
| 2019/0050926 A1 | 2/2019 | Cooper | |
| 2019/0087893 A1 | 3/2019 | Pellew | |
| 2019/0102837 A1 | 4/2019 | Smith et al. | |
| 2019/0122243 A1 | 4/2019 | Mizzone | |
| 2019/0122258 A1 | 4/2019 | Bramberger et al. | |
| 2019/0149633 A1 | 5/2019 | Evans et al. | |
| 2019/0155997 A1 | 5/2019 | Vos et al. | |
| 2019/0163700 A1 | 5/2019 | Baumgardner et al. | |
| 2019/0164140 A1 | 5/2019 | Pasupula | |
| 2019/0236698 A1 | 8/2019 | Postrel | |
| 2019/0244243 A1 | 8/2019 | Goldberg et al. | |
| 2020/0074461 A1 | 3/2020 | DeRosa-Grund | |
| 2020/0234268 A1 | 7/2020 | Kohli | |

\* cited by examiner

PLATFORM FOR MANAGEMENT OF USER DATA

PRIORITY STATEMENT

This application claims priority to U.S. Provisional Patent Application No. 62/908,252 filed Sep. 30, 2019 titled Platform for Management of User Data, respectively, which is hereby incorporated by reference in its entirety.

BACKGROUND

I. Field of the Disclosure

The illustrative embodiments relate to personal data management. More specifically, but not exclusively, the illustrative embodiments relate to a network, system, method, apparatus, and platform for data segmentation, tokenization, and monetization.

II. Description of the Art

Current forms of advertisements rely heavily on traditional blind advertising, such as radio and television. Even online targeting methods depend on semi-blind behavioral or demographic targeting based on cookies, website tracking, data points, and metrics. Statistics indicate that only 8% of Internet users account for 85% of the clicks on display advertisements and 56% of digital advertisements are never seen by a live human being. Cookie-based targeting may be based on past user browsing or other online actions that may be irrelevant to the future intent of the user. Internet advertisements may miss the mark by being undesirable, irrelevant, or server after a purchase has been consummated. As a result, many advertisements are irrelevant to users.

SUMMARY OF THE DISCLOSURE

The illustrative embodiments provide a system, method, device, and platform for for managing data. Data associated with a user received from one of a number of sources. The data is automatically confirmed as applicable to a user. The data is added to a data set associated with the user. A determination is made whether the data set is complete after adding the data to the data set. One or more tokens are created based on the data set of the user.

In another embodiment, one or more data elements associated with user data are received from one of a number of sources. The one or more data elements are automatically confirmed as applicable to a user. The one or more data elements are added to a data set associated with the user. A determination is made whether the data set is complete after adding the data element to the data set. One or more tokens are created based on the data set of the user. Another embodiment provides a processor for executing a set of instructions and a memory storing a set of instructions configured to perform the method herein described.

Another embodiment provides a system for utilizing data. The system includes electronic devices executing a data application. The data application is configured to capture the data associated with a user. The system also includes a data platform accessible by the electronic devices executing the data application through one or more networks. The data platform receives data associated with the user from the electronic devices, automatically confirms the data is applicable to the user, adds the data to a data set associated with the user, determines whether the data set is complete after adding the data to the data set, and creates one or more tokens based on the data set of the user.

Another embodiment provides a data platform. The data platform may include a processor for executing a set of instructions and a memory for storing the set of instructions. The set of instructions may be executed to receive one or more data elements associated with the user data from one of a number of sources, automatically confirm the one or more data elements is applicable to the user, add the one or more data elements to a data set associated with the user, determine whether the data set is complete after adding the data element to the data set, and create one or more tokens based on the data set of the user.

In other embodiments, one or more of the following may be implemented. Instructions are received from the user specifying how the data set is utilized and the user is compensated for sharing the tokens with one or more interested parties. Additional data elements may be requested in response to determining the data set is incomplete utilizing questions, surveys, and a user profile associated with the user. The one or more data elements are authenticated as being associated with the user. The token is a block chain crypto token and points to the data set for secure access by one or more interested parties. Distinct data sets are clustered into a data pool, the data pool is cross populated with distinct data sets, and the data pool is segmented to identify saturation, missing, incomplete, or nonrelevant data. A determination is made regarding the relevance of the data pool to one or more interested parties. Payments are received from one or more interested parties to access the data set utilizing the token. One or more users are compensated for granting access to their data sets. The interested parties represent advertisers, marketers, or businesses that desire access to the user data in the data set.

The illustrative embodiments provide a system, method, and platform for monetizing data. A selection is received from a user to monetize data associated with the user. The data associated with user is compiled. A security token is generated including the data. The data is monetized utilizing the security token in accordance with the selection.

In other embodiments, the data may include digital profiles that are monetized for data. Data validation may be performed through user opt-ins that are identified and confirmed by the user. Token based compensation for consumer data allows for the direct control and monetization of their data (e.g., web data, application data, profiles, personal measurements, readings, etc.). Compensation may be performed through digital currencies, hard currencies, charitable contributions, and tax deductions. The earnings for a user may also be donated. Users may be rewarded for additional data uploads, updates, additions, amendments, surveys/questionnaire fulfillment, and so forth. The tokens may be utilized to pay a vendor or third party for a product, service, system, or data, secure a digital asset, tracking the life of an asset, share a stake in an asset or company, participate in an initial coin offering, receive a reward, maintaining and managing a digital asset, make a charitable contribution, or receive a tax deduction.

BRIEF DESCRIPTION OF THE DRAWINGS

Illustrated embodiments are described in detail below with reference to the attached drawing figures, which are incorporated by reference herein, and where.

DETAILED DESCRIPTION OF THE DISCLOSURE

Figure 1:
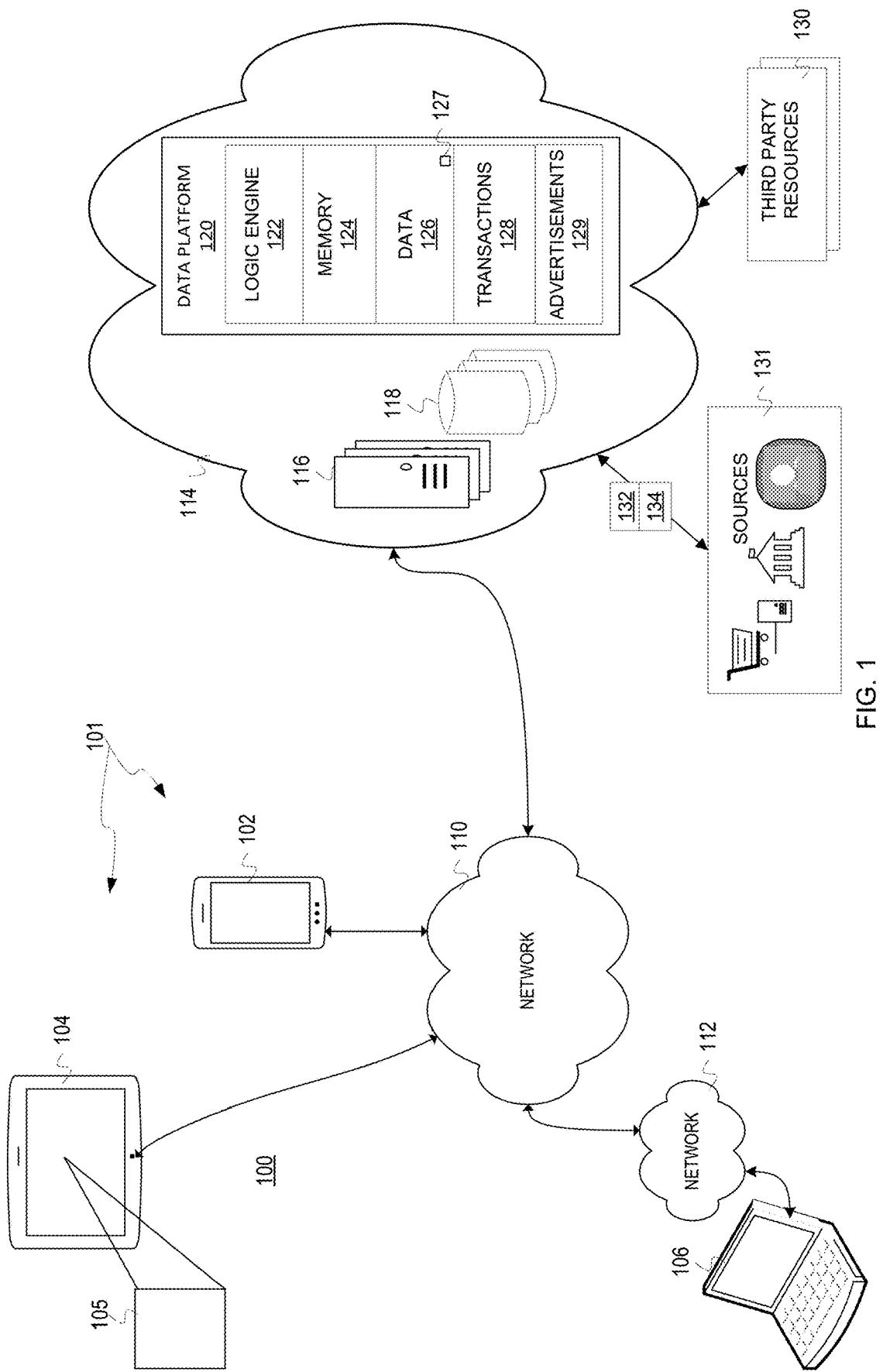
FIG. 1 is a pictorial representation of a system for managing user information in accordance with an illustrative embodiment.

The illustrative embodiments provide a network, system, method, platform and devices for data segmentation for improved data management. The data management may include data control, data governance, and data valuation. The illustrative embodiments provide individual consumers, entities, organizations, corporations, and data vendors a measurements, pool, segment, and value for consumer and corporate data. As a result, the data may be utilized as a measurable asset. The data value may be derived from the segmentation and identification of unique data points within a larger shared data pool. The data may be captured based on equity holdings, credit card activity, and user specified parameters, actions, and preferences to be processed for the purpose of targeting advertisements to consumers. The illustrative embodiments create a relationship between data sets regarding ownership of stock portfolios, equities, and user associated interests and the products that consumers buy or are shopping for that are owned by the companies represented within their portfolios.

Data tracking and segmentation provides for improved real-time and online advertisements, product recommendations, stock tips and shopping recommendations via an ad-targeting network. The advertisements may be generated in real-time in any number of formats, such as digital advertisements/content, audio advertisements, video advertisements, visual advertisements, print advertisements, and so forth. The improvements allow advertisements to be selectively targeted based on consumer profiles that may include real-time and historical purchasing data and the real-time and historical stock and equity portfolios. Data from multiple primary sources may be leveraged towards the targeted advertising including stock trading data, stock custody data and consumer credit and debit card transaction data.

The advertising network data is processed, and advertisements are delivered to users/consumers so that the user may act in their own best interests and purchase products, services, and commodities that are in alignment with their holdings. This technology tool provides investors who own stock in specific companies a methodology/technology to support that stock ownership by receiving targeted purchase recommendations and advertisements that allows consumers them to make informed purchase decisions that facilitate and support the success of each stock held within their own individual investor portfolio by purchasing those products/services. Alternatively, when users buy products (or services) outside the products represented in their portfolios, the user may receive data and advertisements from brokers to buy or switch to the stocks associated to those products.

The illustrative embodiments utilize data records from stock transactions, equities, credit card transactions, purchase histories, receipts/invoices, user preferences, and other self-interests to perform targeted advertisements. Different data clearing houses, groups, or parties may be utilized to process and verify user and consumer data. For example, every stock transaction including the stock, shares, amount, type of transaction (e.g., limit, market, short, futures transaction, option, etc.), and other information is received, processed, and stored.

The illustrative embodiments provide a system, method, platform, and network for encrypting, securing, developing, and managing data valuations, transactions, and utilization. The data may be accessible from any number of authorized and connected devices. The illustrative embodiments allow users/consumers, consumer groups, companies, organizations, entities, governments, and other parties worldwide to develop data strategies and the conversion of any data into a monetizable asset (including a transactable token currency). The illustrative embodiments further provide a platform for capturing, identifying, monetizing, converting, utilizing, and improving data.

As referenced herein, data refers to the personal or commercial data, user profiles, web profiles, search profiles, application profiles, and other information applicable to a user, consumer, entity, device, system, program, or other party. The illustrative embodiments comply with all or most applicable data privacy and administration rules, laws, and best practices. Any number of mobile devices, computers, machines, servers, arrays, or so forth may be utilized to implement the illustrative embodiments. A user may tokenize his/her data and convert all applicable data into an asset that may be controlled, valued, and monetized in commercial transactions. The illustrative embodiments also provide the user the ability to control data generation and the seamless utilization of the data. For example, algorithmic processing may determine how and when online and digital data is utilized and monetized, the price point or fair data valuation based on applicable pricing (e.g., demographic, global, location, utilization, etc.) based on going rates, principles of supply and demand, market economics, market analysis, machine learning, exchanges, auctions, real-time bidding, artificial intelligence, and so forth. Relevant information regarding data utilization may be acquired in real-time, based on historical transactions/archives, selling prices, or other applicable information or data that informs the value of a data sale or transaction. The illustrative embodiments allow the end user to select advertisement preferences that coincide with their stocks/shares, ownerships, interests, holdings, demographics, opinions, behaviors, beliefs, social structure, purchase plans, and real-world desires.

The illustrative embodiments may receive, process, collect, and source data from any number of traditional data collection methods, such as online (e.g., websites, mobile applications, user profiles, etc.) and real-world sources (e.g., location, retail purchases, credit card purchases, etc.). The illustrative embodiments are a considerable improvement over traditional targeting, advertising, and marketing techniques, processes, and systems. For example, traditional blind advertisements may be transformed into a precisely targeted advertisement based on user verified and confirmed data, sources and information allowing each individual user to indicate products and service interests. Data in each user's data profile may be effectively utilized. Data, profiles, data sets, data pools, and other compilations may be tokenized to better protect, manage, and monetize the various types of data.

In one embodiment, tokens may be created that track the data. The tokens may include information or metadata regarding the data and may point to a location where the data is stored. The token may be utilized to provide a key, identifier, pointer, indicator, or link required to securely access the data. As a result, the tokens may be created, communicated, bought, sold, and otherwise monetized through a block chain system. The tokens may include a pointer that securely points to the data being monetized whether for a single user, organization, company, or multiple users. In another embodiment, the tokens may include the data that is being monetized or otherwise exchanged.

The illustrative embodiments may be utilized to perform a transaction for the data. The data may be grouped, associated, and commoditized for any number of trades, exchanges, purchases, donations, or other transactions. The data may be associated with a platform for transactions involving the data and associated advertisements. The transaction may be performed automatically or based on user input, feedback, instructions, or commands.

One embodiment provides a blockchain based security token system that gives consumers the ability to control, monetize, and/or donate any or all of the proceeds from the utilization, sale, or sharing of their profile and/or data and advertising-based revenue. The illustrative embodiments curate or collect data in real-time from users based on an opt-in system with clear compensation and renumeration guidelines. For example, any number of computing or communications devices, platforms, applications, or so forth may be utilized to capture the data.

The security tokens utilized may represent any number of existing, custom/proprietary, and other tokens. In one embodiment, formatted, structured, or unstructured data may be converted into an encrypted token that represents, includes, or references the applicable data. The security interest in a data asset may be represented in the form of a token. Data across numerous fields and with different utilizations may be captured in a token (or tokenized). For example, intelligence, counterintelligence, consumer profiles, consumer/user, private, public, and other types of data may be captured and monetized. For example, the illustrative embodiments may provide a data management system that allows an asset, such as ownership of a digital profile to be tokenized as an asset that may be tracked, grown, and expanded through an opt in submission from multiple sources and monetized digitally through an e-commerce platform.

The security tokens may be issued, regulated, managed, and distributed by a platform to comply with the existing regulatory framework. The platform may provide a data monetization process for creating and performing transactions between buyers and sellers (e.g., similar to a stock trading platform). The illustrative embodiments may apply pricing based on a set price range, guidelines, industry-standard, or market rate. The data in the form of a token may allow the user to directly control and monetize their data in a transparent and secure blockchain platform. Consumers may receive security tokens in several ways when they sign up to participate in the system/service, when and where they opt in to include their data in the marketplace, and when corporations and/or third parties purchase or monetized access to their data. For example, the data may be managed within a self-directed and mobile computing environment. The illustrative embodiments allow users to determine how and when their data is shared and monetized eliminating guesswork used by search, advertising, and marketing companies to generate user approved and desired consumer marketing data.

In one embodiment, the asset of data is created by the opt-in submission of a user's stock/ownership/interest profile, trading profile/account, social network profile(s), website utilization profiles, or generic/customized profile, and the associated data. The platform may be further used to secure all rights to any revenue streams associated with the data asset (e.g., any sale, sharing, or monetization of the user profile to ⅓ party, site, or advertiser). By opting into the program, the user is providing their profile and perfecting the profile to match their actual daily living and purchases of products. As a result, the illustrative embodiments put the user in full control of the use and monetization of their data while avoiding the erroneous or inaccurate use of information inherent in currently available advertising programs and systems. The illustrative embodiments eliminate third-party unauthorized or on monetized use of poor user data and instead enables an accurate and monetized data stream to be created for the user. The user benefits as well as third parties that are able to use the more accurate data. For example, assets associated with the user (e.g., stocks, hedge funds, business entities, charitable organizations, etc.) may benefit by adding revenue, increasing in value/valuation, and otherwise benefiting the user.

The illustrative embodiments may enable the user to track utilization and monetization of their data in a more transparent fashion. As a result, the user may be able to see and track dividends, revenue sharing, price appreciation, or other forms of asset monetization. For example, a value-based reward system tracked utilizing blockchain may be implemented. Smart contracts may be utilized with blockchain to ensure proper utilization and monetization of the data for verification purposes. The secured token generation process of the user data/profile provides proof of ownership to the user and ensures contract conditions are written into the smart contract code within the blockchain structure. The blockchain records maintain and track the creation, issuance, management, and monetization of each token throughout the lifetime of the user's involvement and ownership of their data. In one embodiment, a user may be rewarded with additional tokens for keeping their data/profile updated as well as for additional participation in activities, such as surveys, watching a video, verifying a purchase, adding studies, product marketing, expanded data provisioning, and questionnaires.

The user may be incentivized to provide additional data, such as pictures, audio content, videos, location (e.g., real-time, GPS, beacon, triangulation, delayed for safety, historical, etc.), Internet protocol address, identification of friends from each social network, sharing access to third-party applications, search data, views, likes, shares, comments, and so forth. As a result, the user may specify advertisement preferences that are associated with their stocks, portfolio, assets, equities, holdings, interests, demographics, opinions, behaviors, beliefs, social structure, purchase plans, and real-world desires. The user data that is recorded and stored may reside permanently on the blockchain, but typically only has a three-year lifecycle to be relevant. Thus, the user is incentivized to maintain, share, and update their data and associated profiles.

The data profile may be singular to a user or may be expanded to include deeper insights into a family, group of friends, employees, or other affiliated or associated groups. For example, a family circle profile may include an opt in for parents, children, grandparents, uncles, cousins, neighbors, family friends, and so forth. The data profile may be shared as a family asset between a partner, spouse, and children allowing the family data to be managed and monetized as a single asset. As a result, advertisers and others may get deeper insights into participating users. The illustrative embodiments manage the data collection, pricing, reconciliation, verification, payments, or so forth. Advertisers may be able to identify consumer data that is relevant to their campaign in order to provide direct incentives and/or monetization for users who provide specific advertiser-based insights. For example, a user may select to support a corporate restaurant of which a brother is a part-owner, an online educational institute that a friend works for, or a business that supports charities approved of by the user.

The illustrative embodiments may also allow user to transfer or donate the revenue or value generated for a charitable deduction or associated tax deduction. Each of the described data components is 100% opt in with users being rewarded for sharing specific data points that are desirable to advertisers or other third parties. For example, users may opt-out of specific data points that the do not wish to share with advertisers. The data captured by the illustrative embodiments may be consolidated and purchased by advertisers who provide incentives, rewards, or donations in exchange for access to users and focus group data used for the mining of advertiser-based user insights, analytics, marketing, and advertisement targeting.

The illustrative embodiments may also be utilized to create a data index that catalogs user profiles, data sets, and data transactions. Advertisers may then select a pricing structure for each type of data profile component that is desirable to advertisers thereby creating a virtual market for advertisers to purchase real time user data. The changing values of the data may be tracked over time for specific user profiles, consumer groups, and data pools based on their value to advertisers. The use of security tokens tied to user profiles creates a marketable asset that gives greater validity to commercial uses of blockchain technologies and the security token market.

Cryptographic, security, or digital tokens may be exchanged for actual currency, preferred stock options, stock warrants, bonds, exchange traded fund (ETF) shares, cryptic or, initial coin offerings (ICO), gift cards, vouchers, and other forms of compensation. Tokens may be utilized to communicate data and compensate users, service providers, aggregators, advertisers/marketers, and other applicable parties. The systems may also manage any number of smart contracts between relevant parties, such as the users/consumers, service providers, network operators, content providers, and so forth. The tokens utilized by the illustrative embodiments may be utilized for any number of purposes including compensation, communicating the data, data sets, and data pools, and secure management of the data. The system may utilize multiple types of tokens (e.g., asset tokens, utility tokens, etc.) that are utilized together within the blockchain. Various smart contracts and/or decentralized applications may be self-executed to process and manage the various transactions occurring on the blockchain. The illustrative embodiments including the systems, methods, devices, processes, and components described herein may implement any number of blockchain implementations.

The block chain system may utilize crypto-protocols and crypto-token-protocols. For example, the block chain system may generate tokens, manage a protocol utilizing a consensus algorithm, and record the transactions and other actions in a distributed ledger. The various protocols may control who, when, and how the various parties may control and otherwise manage the blockchain through any number of public and private permissions.

The illustrative embodiments may be utilized to circumvent traditional cookie-based ad targeting through the utilization of profile data segmentation on block-chain. In the the past, traditional cookie-based targeting relied on browsing actions of a user to target the future intent of a consumer. The antiquated cookie-based targeting relies on past behavioral indicators to help pinpoint future product relevance to an audience. Often such processes are lacking in producing positive outcomes because the data is often no longer relevant or the intent to purchase has already taken place. An additional consideration is the collection and utilization of private and personal data without the necessary protection mechanisms in place to protect the user data.

In online advertising the industry has been focused on cookie, behavioral, and contextual online advertising because it provides the ability to drive a small percentage of consumers towards advertisers. The illustrative embodiments provide a system, method, platform, and devices for consumer data protection and validation that utilizes artificial intelligence and the blockchain to provide consumers with a control and validation mechanism that uses intelligent and validated ad-targeting to reach consumers of interest. The illustrative embodiments also ensure consumer privacy and eliminates the guess work used in cookie, behavioral, and contextual ad-targeting.

In one embodiment, a database of the user's data and profile may be utilized to automatically select applicable digital advertisements. The self-referential database may be utilized to reference the applicable information and then provide the optimized advertisements or actions to be performed based on the user's own data, preferences, and permissions.

The illustrative embodiments may be utilized to generate digital advertisements or content. The illustrative embodiments may also be utilized to generate physical advertisements, audio advertisements, broadcast advertisements, and so forth. The advertisements are highly effective and relevant to the applicable user.

FIG. 1 is a pictorial representation of a system 100 for managing user information in accordance with an illustrative embodiment. In one embodiment, the system 100 of FIG. 1 may include any number of devices 101, networks, components, software, hardware, and so forth. In one example, the system 100 may include a smart phone 102, a tablet 104 displaying graphical user interface 105, a laptop 106 (altogether devices 101), a network 110, a network 112, a cloud system 114, servers 116, databases 118, a data platform 120 including at least a logic engine 122, a memory 124, data 126, tokens 127, and transactions 128. The cloud system 114 may further communicate with sources 131 and third-party resources 130. The various devices, systems, platforms, and/or components may work alone or in combination.

Each of the devices, systems, and equipment of the system 100 may include any number of computing and telecommunications components, devices or elements which may include processors, memories, caches, busses, motherboards, chips, traces, wires, pins, circuits, ports, interfaces, cards, converters, adapters, connections, transceivers, displays, antennas, operating systems, kernels, modules, scripts, firmware, sets of instructions, and other similar components and software that are not described herein for purposes of simplicity.

In one embodiment, the system 100 may be utilized by any number of users, organizations, or providers to aggregate, manage, review, analyze, process, distribute, advertise, market, display, and/or monetize data 126. The data may include personal data, commercial data, data sets, data pools, and other forms of data. For example, the data 126 may be utilized in marketing or advertisements for goods or services associated with the user (as well as family and friends as allowed or specified). In one embodiment, the goods and services represent any number of items, content, products, or services sold by a business, entity, organization, or entity. In one embodiment, the system 100 may utilize any number of secure identifiers (e.g., passwords, pin numbers, certificates, etc.), secure channels, connections, or links, virtual private networks, biometrics, or so forth to upload, manage, and secure the data 126, generate tokens, and perform applicable transactions. As noted, the system 100 may be a blockchain system that utilizes a digital ledger to track tokens 127, transactions 128 involving the data 126 and advertisements 129. For example, the digital ledger may store the data 126, tokens 127, transactions 128, and advertisements 129 along with their details, information, and data. The devices 101 are representative of multiple devices that may be utilized by businesses or consumers, including, but not limited to the devices 101 shown in FIG. 1. The devices 101 utilize any number of applications, browsers, gateways, bridges, or interfaces to communicate with the cloud system 114, platform 120, and/or associated components. The devices 101 may include any number of Internet of Things (IoT) devices, intelligent network devices, consumer devices (e.g., gaming devices, smart televisions, tablets, personal computers, etc.).

The data 126 may include a number of different data types. The data 126 may include demographic data, consumer data, family and health data, property data, interests and activity data, and other applicable types of data. The data 126 or advertisements 129 may store the good, services, and products that the user is interested in. The data 126 and advertisements 129 may be discretely or continuously analyzed and processed at time intervals, based on conditions, or in real-time. In one embodiment, the advertisements 129 are automatically generated in response to the data 126 as created, updated, or modified. The advertisements 129 may also be selected based on the data 126 for digital presentation, visual presentation, audio communication, print creation, augmented reality communication, holographic display, virtual reality communication, or other formats. As previously noted, the advertisements may already exist or may be custom created for the user. The advertisements 129 may be presented in electronic, print, and other applicable formats. The user may represent individuals, families, groups, entities, businesses, aggregations, or other parties.

Demographic data may be a combination of static and influx data points that include age, gender, occupation, marital status, education/education level, income level, religion, birthday, family size, and so forth. Demographic data, although mostly static, is commonly quite important to marketers and other interested parties. Consumer data may include websites visited, purchase plans, purchases, brand affinity, cars, clothes, travel, and other information applicable to users, clients, customers, groups, or so forth. The family and health data may include permanent or long-lasting data elements which may be helpful for predicting future purchases and include information related to family, health, and medical conditions, such as child care, diapers, diabetes, incontinence, rental information, and so forth. The family and health data have a large potential for cross marketing of data. Property data may include information regarding ownership, rentals/renters, address, for sale, occupants, pool, and vehicle ownership. This data may be treated and value as static data (even though changes are likely and expected). The interests and activity data may include data regarding hobbies, general interests, product and brand preferences, and other applicable influx data. Political affiliation data may be a matter of public record in many states as the user self identifies. The data may be static, or perennial based on the user's voting record. As with other data, the user may choose to self-identify political and voting information or may keep that private.

The wireless device 102, tablet 104, and laptop 106 are examples of common devices 101 that may be utilized to capture, receive, and manage data 126, perform transactions 128, and communicate advertisements 129. For example, the various devices may capture data relevant to the user that is subsequently monetized for the benefit of the user (e.g., location, purchases, behavior, web activity, application use, digital purchases, etc.). Other examples of devices 101 may include e-readers, cameras, video cameras, electronic tags, audio systems, gaming devices, vehicle systems, kiosks, point of sale systems, televisions, smart displays, monitors, entertainment devices, medical devices, virtual reality/augmented reality systems, or so forth. The devices 101 may communicate wirelessly or through any number of fixed/hardwired connections, networks, signals, protocols, formats, or so forth. In one embodiment, the smart phone 102 is a cell phone that communicates with the network 110 through a 5G connection. The laptop 106 may communicate with the network 112 through an Ethernet, Wi-Fi connection, cellular, or other wired or wireless connection.

The data 126 may be collected and sourced from any number of online and real-world sources including, but not limited to, clearinghouses (e.g., stocks, credit card transactions, etc.), website traffic and cookie-based analytics, social media and application data, point of sale, purchase, and transaction history, loyalty programs and coupons, payment services, location-based email list for mailers, surveys and questionnaires, and other applicable sources. The data 126 may be captured based on the permissions, authorization, and confirmation of the user. For example, the data 126 may include stock trading data, stock custody data, and consumer credit/debit card transaction data. The data 126 may also store information regarding a user's purchases (e.g., past, present, future, likely, etc.), interests (e.g., personal, commercial, etc.), business/business needs, and other applicable information. The data 126 may also store information regarding the family, friends, and associates of the user if authorized or requested by the user. As a result, the user may be able to support businesses and groups associated with friends and family as well by receiving targeted advertisements and potentially purchasing goods/services based on those advertisements. In one example, the user may be prompted or alerted regarding how the data 126 corresponding with them intersects with their potential purchases (e.g., services, goods, products, etc.), interests, investments, charitable contributions, travel, and other activities and actions. The user may receive real-time alerts, notifications, reminders, or updates based on the data 126 that may serve the user's bests interests.

These same data collection sources may be utilized to perform analysis of the data 126. In one embodiment, the data 126 may be captured through registered account information, programs/applications, website traffic, and tracking cookie-based analytics. For example, information, such as time spent on each site, page views, clicks, conversions, relevant content, trends, and other information may be recorded as part of the data 126. The data 126 may also include digital or online transactions performed through services, such as PayPal, Venmo, Zelle, Google, Square, WePay, Skrill, Payza, Stripe, Dwolla, Amazon Pay, 2checkout, and other similar established or developing services.

The data 126 may be captured through social media and applications. Social media data may be utilized to provide real-time polls, surveys, questionnaires, likes and dislikes, feedback, preferences for media content, site traffic, interests, and numerous other consumer data. Any number of mobile, computing, personal assistant (e.g., Siri, Alexa, Cortana, Google, etc.), or other applications may be utilized. Social media data may be utilized as definitive or anecdotal data. The data 126 may also be captured through keywords, facial recognition (e.g., emotions), comments, or so forth.

The data 126 may also be captured through point of sale (POS) transactions, card transactions, in-person purchase, digital purchases, and purchase history. In one embodiment, a credit card clearing house may be utilized to capture the data. Customers, consumers, and clients may be comfortable with sharing the specific data points associated with point-of-sale transactions due to established practices. The point-of-sale transactions may include extensive data, including, but not limited to, name, address, item/service, price, credit card type, purchase location, date, brand preference, brand category, product affinity, spending levels, order history, inventory, restock data, purchase demographics, and so forth. Point-of-sale and transaction history data may have static, perennial, and influx data points with the value of each data point being tracked and measured within the data valuation index and the data derivatives marketplace.

The data 126 may also include location-based information and communications. An example of static and perennial data points that may be collected include a standard web form, email request form, wireless triangulation, routers/towers/access points reached, proximity beacons, and so forth. The location-based communications may capture data, such as email, consumer/business addresses, phone numbers, and so forth.

The data 126 may also include surveys and questionnaires. Responses to surveys and questionnaires may be one of the best ways to gather and inform information regarding the user's demographics, interests, and preferences that may not be able to be determined in other ways due to privacy, entity names, applicable laws, and so forth. The ability to gather real-world consumer insights may help complete or round out a user profile. The surveys and questionnaires may be performed digitally (e.g., websites, extensions, programs, applications, browsers, texting, or manually (e.g., audibly, on paper, etc.). Responses to surveys and questionnaires may help achieve saturation of datapoints for user profiles. Permission to utilize information, data, or activities may be performed once or repeatedly to ensure that the user understands how the data 126 is being gathered and utilized.

The cloud system 114 may aggregate, manage, analyze, and process data 126 and tokens across the Internet and any number of networks, sources 131, and third-party resources 130. For example, the networks 110, 112, 114 may represent any number of public, private, virtual, specialty (e.g., trading, financial, cryptocurrency, etc.), or other network types or configurations. The different components of the system 100, including the devices 101 may be configured to communicate using wireless communications, such as Bluetooth, Wi-Fi, or so forth. Alternatively, the devices 101 may communicate utilizing satellite connections, Wi-Fi, 3G, 4G, 5G, LTE, personal communications systems, DMA wireless networks, and/or hardwired connections, such as fiber optics, T1, cable, DSL, high speed trunks, powerline communications, and telephone lines. Any number of communications architectures including client-server, network rings, peer-to-peer, n-tier, application server, mesh networks, fog networks, or other distributed or network system architectures may be utilized. The networks, 110, 112, 114 of the system 100 may represent a single communication service provider or multiple communications services providers.

The sources 131 may represent any number of clearing houses, web servers, service providers (e.g., trading platforms, credit card companies, transaction processors, etc.), distribution services (e.g., text, email, video, etc.), media servers, platforms, distribution devices, or so forth. In one embodiment, the sources 131 may represent the businesses, individuals, entities, or groups that purchase, license, or utilize the data 126, such as for advertising or marketing goods and services utilizing the system 100. In one embodiment, all, combinations, or a portion of the system 100, cloud system 114, or cloud network, including the data platform 120, may be specially configured to perform the illustrative embodiments and may be referred to as a system or platform.

The cloud system 114 or network represents a cloud computing environment and network utilized to aggregate, process, manage, generate, sell, monetize, and distribute data 126 and advertisements 129 while supporting the transactions 128 and utilization. The cloud system 114 may implement a blockchain system for managing the data 126, transactions 128, and advertisements 129. For example, any number of blockchain tokens may be utilized to manage the data and ensure proper compensation of the user. The cloud system 114 allows data 126, transactions 128, and advertisements 129 from multiple businesses, users, managers, or service providers to be centralized. In addition, the cloud system 114 may remotely manage configuration, software, and computation resources for the devices of the system 100, such as devices 101. The cloud system 114 may prevent unauthorized access to data 126, tools, and resources stored in the servers 116, databases 118, and any number of associated secured connections, virtual resources, modules, applications, components, devices, or so forth. In addition, a user may more quickly upload, aggregate, process, manage, view, and distribute data 126 (e.g., profiles, updates, surveys, content, etc.), transactions 128, and advertisements 129 where authorized, utilizing the cloud resources of the cloud system 114 and data platform 120.

The cloud system 114 allows the overall system 100 to be scalable for quickly adding and removing users, businesses, authorized sellers, interest-based information, transaction based information, analysis modules, distributors, valuation logic, algorithms, moderators, programs, scripts, filters, transaction processes, distribution partners, or other users, devices, processes, or resources. Communications with the cloud system 114 may utilize encryption, secured tokens, secure tunnels, handshakes, secure identifiers (e.g., passwords, pins, keys, scripts, biometrics, etc.), firewalls, digital ledgers, specialized software modules, or other data security systems and methodologies as are known in the art.

Although not shown, the cloud system 114 may include any number of load balancers. The load balancer is one or more devices configured to distribute the workload of processing the uploaded data 126 as well as applicable transactions to optimize resource utilization, throughput, and minimize response time and overload. For example, the load balancer may represent a multilayer switch, database load balancer, or a domain name system server. The load balancer may facilitate communications and functionality (e.g. database queries, read requests, write requests, command communications, stream processing, etc.) between the devices 101 and the cloud system 114. For example, the cloud system 114 may offload verification of users that seek to be added to the system 100 along with applicable data 126 and information. Load balancing may be performed between automatic systems and devices as well as individual users. Other intelligent network devices may also be utilized within the cloud system 114.

The servers 116 and databases 118 may represent a portion of the data platform 120. In one embodiment, the servers 116 may include a web server 117 utilized to provide a website, mobile applications, and user interface (e.g., user interface 107) for interfacing with numerous users. Information received by the web server 117 may be managed by the data platform 120 managing the servers 116 and associated databases 118. For example, the web server 117 may communicate with the database 118 to respond to read and write requests. For example, the servers 116 may include one or more servers dedicated to implementing and recording blockchain transactions and communications involving the data 126, transactions 128, and advertisements 129. For example, the databases 118 may store a digital ledger for updating information relating to the user's data 126 and transactions 128 as well as utilization of the data 126 and transactions 128 to generate and communicate the advertisements 129. For example, the user's data 126 may be packaged in digital tokens that may be securely communicated to any number of relevant parties. In one embodiment, the advertisements 129 are custom created based on the user's data 126 and transactions 128. As noted, the transactions 128 may represent past, potential/present, or future transactions. As a result, information may be given based on historical information, real-time data, or anticipated/future information.

The databases 118 may utilize any number of database architectures and database management systems (DBMS) as are known in the art. The databases 118 may store the content associated with each user/consumer/purchaser which may specify an address, name, age, demographics, interests, family/friend information, biometric identifiers, payment information, permissions, settings, location, cause preferences, cause restrictions, and so forth. Any number of secure identifiers, such as tones, QR codes, serial numbers, alphanumeric references, biometrics, or so forth may be utilized to ensure that content, personal, or transaction information is not improperly shared or accessed. The databases 118 may include all or portions of a digital ledger applicable to one or more block chain transactions including token generation, management, exchange, and monetization. The databases 118 may also include the secure identifiers.

The user interface 105 may be made available through the various devices 101 of the system 100. In one embodiment, the user interface 105 represents a graphical user interface, audio interface, or other interface that may be utilized to manage data, transactions, and other information. For example, the user may enter or update associated data utilizing the user interface 105 (e.g., browser or application on a mobile device). The user interface 105 may be presented based on execution of one or more applications, browsers, kernels, modules, scripts, operating systems, or specialized software that is executed by one of the respective devices 101.

The user interface 105 may display current and historical data as well as trends. The user interface 105 may be utilized to set the user preferences, parameters, and configurations of the devices 101 as well as upload and manage the data, content, and implementation preferences sent to the cloud system 114. The user interface 105 may also be utilized to communicate the advertisements 129 to the user. The devices 101 (e.g., displays, indicators/LEDs, speakers, vibration/tactile components, etc.) may present, play, display, or otherwise communicate the advertisements 129 visually, audibly, tactilely, virtually, or any combination thereof.

In one embodiment, the system 100 or the cloud system 114 may also include the data platform 120 which is one or more devices utilized to enable, initiate, generate, aggregate, analyze, process, and manage data 126, transactions 128, advertisements 129, and so forth with one or more communications or computing devices. The data platform 120 may include one or more devices networked to manage the cloud network and system 114. For example, the data platform 120 may include any number of servers, routers, switches, or advanced intelligent network devices. The data platform 120 may represent one or more web servers that perform the processes and methods herein described. The cloud system 114 may manage block chain management of the data 126 utilizing block chain technologies, such as tokens, digital ledgers, hash keys, instructions, and so forth.

In one embodiment, the logic engine 122 is the logic that controls various algorithms, programs, hardware, and software that interact to receive, aggregate, analyze, rank, process, score, communicate, and distribute data, content, transactions, alerts, reports, messages, or so forth. The logic engine 122 may utilize any number of thresholds, parameters, criteria, algorithms, instructions, or feedback to interact with users and interested parties and to perform other automated processes. In one embodiment, the logic engine 122 may represent a processor. The processor is circuitry or logic enabled to control execution of a program, application, operating system, macro, kernel, or other set of instructions. The processor may be one or more microprocessors, digital signal processors, application-specific integrated circuits (ASIC), central processing units, or other devices suitable for controlling an electronic device including one or more hardware and software elements, executing software, instructions, programs, and applications, converting and processing signals and information, and performing other related tasks. The processor may be a single chip or integrated with other computing or communications elements.

The memory 124 is a hardware element, device, or recording media configured to store data for subsequent retrieval or access at a later time. The memory 124 may be static or dynamic memory. The memory 124 may include a hard disk, random access memory, cache, removable media drive, mass storage, or configuration suitable as storage for data 126, transactions 128, instructions, and information. In one embodiment, the memory 124 and logic engine 122 may be integrated. The memory 124 may use any type of volatile or non-volatile storage techniques and mediums. In one embodiment, the memory 124 may store a digital ledger and tokens for implementing a blockchain processes.

In one embodiment, the cloud system 114 or the data platform 120 may coordinate the methods and processes described herein as well as software synchronization, communication, and processes. The third-party resources 130 may represent any number of human or electronic resources utilized by the cloud system 114 including, but not limited to, businesses, entities, organizations, individuals, government databases, private databases, web servers, research services, and so forth. For example, the third-party resources 130 may represent advertisement agencies, marketers, e-commerce companies, verification services, credit monitoring services, block chain services, payment providers/ services, and others that pay for rights to use the data 126, track or provide information regarding the transactions 128, and create or monitor utilization of the advertisements 129.

In one embodiment, the data platform 120 may implement a blockchain ledger, manager, or technology. In another embodiment, the blockchain ledger may be accessible through sources 131. Any number of existing, developing, or future blockchain companies or providers may be utilized (e.g., Aeternity, Ethereum, Bitcoin, Dfinity, ContentKid, Blockphase, Chain of Things, Flowchain, Decissio, Cognate, SkyHive, Safe, etc.).

The blockchain is utilized as a way to store and communicate the data 126, transactions 128, and advertisements 129. The blockchain may utilized one or more distinct ledgers for different entities, services providers, types of data, users, or so forth. For example, each new user with data received by the data platform 120 is assigned a token or other secure identifier. In one embodiment, the digital tokens may be managed utilizing a key that allows the user or controlling party to access the ledger. In one example, the tokens may be controlled by the user or control may be reassigned. The blockchain may cross-reference updates to the data 126 with the original record for the data platform 120 to ensure proper maintenance, control, licensing, management, and transactions. In one example, different licensing tiers, pricing algorithms, license verification, cause information, and payments are combined to create a unique platform. The illustrative embodiments provide a system 100, cloud system 114, and data platform 120 for using user data, specifically stocks, equities, ownership, holdings, and interests, to generate generic, selective, custom, or targeted advertising. The illustrative embodiments are performed based on the user's request, authorization, or approval to apply with all applicable laws and standards.

The blockchain may also utilize any number of payment systems (e.g., PayPal, Venmo, Dwolla, Square, wire transfers, credit cards, Quicken, etc.) to receive money and distribute payments to the applicable party. In one embodiment, the data platform 120 may receive a small fee or percentage per transaction, data uploaded/updated, data purchased, shared, or licensed, purchased item, browsing session, or so forth. In one embodiment, the data platform 120 may be utilized to verify users and advertisers (as well as other users/entities that utilize the data platform 120) and associated data 126 and transactions 128 associated with the data 126.

The third-party resources 130 may represent any number of electronic or other resources that may be accessed to perform the processes herein described. For example, the third-party resources 130 may represent government, private, and charitable servers, databases, websites, programs, services, and so forth for verifying the data 126, transactions 128, and the advertisements 129. In another example, auditors may verify the advertisements 129 are actually generated based on the data 126 including the transactions 128.

Various data and venue owners that access the data platform 120 may legally extract and tokenize the data 128, transactions 128, and advertisements for use in the exchange provided by the system 100 by identifying and tracking data utilizing automatic data extraction tools. Any number of privacy and data policies may be implemented to ensure that applicable local, State, Federal, and International laws, standards, and practices are procedures are met.

In one embodiment, a user or consumer group represented by a user of the devices 101 or the sources 131 may elect and receive permission to collect observational data collected from secure and authorized systems to achieve access to partial or complete data from the sources 131 (e.g., professional drivers, human resources, prison records, property values, real estate sales, retail sales, retail prices, commerce, waste stream data, etc.).

The logic engine 122 may also perform valuation of the data 126 and advertisements as is taught by PCT/US19/59920 entitled "Method and System for Data Valuation and Secure Commercial Monetization Platform" and filed Nov. 5, 2019 and as is taught by PCT/US20/25495 entitled "Method and System for Data Futures Platform" filed Mar. 29, 2020 which are hereby incorporated by reference in their entirety. The illustrative embodiments may also support third-party utilization of the data 126 and transactions 128 to generate the advertisements 129. Various authorization, auditing, and validation processes may be performed by auditing groups, commissions, industry groups, or other professionals/entities. The various embodiments may also allow a user to donate the value of their data 126 and transactions 128 and consumption of advertisements 129.

In one embodiment, the logic engine 122 may utilize artificial intelligence. The artificial intelligence may be utilized to enhance data 126, analyze transactions 128, and generate advertisements 129 to increase value, utilization, effectiveness, and profits. For example, artificial intelligence may be utilized to review, authenticate, and validate data and transactions that are received by the system 100. The artificial intelligence of the logic engine 122 may be utilized to ensure that the data 126 is improved, accurately analyzed, and value increased. For example, it is expected that data and the associated tokens that are validated utilizing artificial intelligence may be given a premium value by advertisers.

In another embodiment, the devices 101 may include any number of sensors, appliances, and devices that utilize real time measurements and data collection to update the data 126. For example, a sensor network, wearables (e.g., watches, bands, implantable devices, etc.) and Internet of things (IOT) devices may gather user and behavioral data. The data platform 120 may also work in conjunction with hands-free data mining and measurement tools that tracks location, activity, and video-based marketing data (e.g., from GPS location, video from storefronts, beacon detection, proximity alerts, etc.) from any number of third-party sources. The user may be tracked through any number of environments, locations, and conditions. The advertisements 129 may also be generated based on the activities, actions, and location of the user.

In one embodiment, the data platform 120 may extract data from third-party platforms by opting in and providing user credentials to various applications (e.g., Charles Schwab, TD Ameritrade, E*Trade, Vanguard, Fidelity, Merrill Lynch, etc.) the data platform 120 may extract data from the sources 131.

Figure 2:
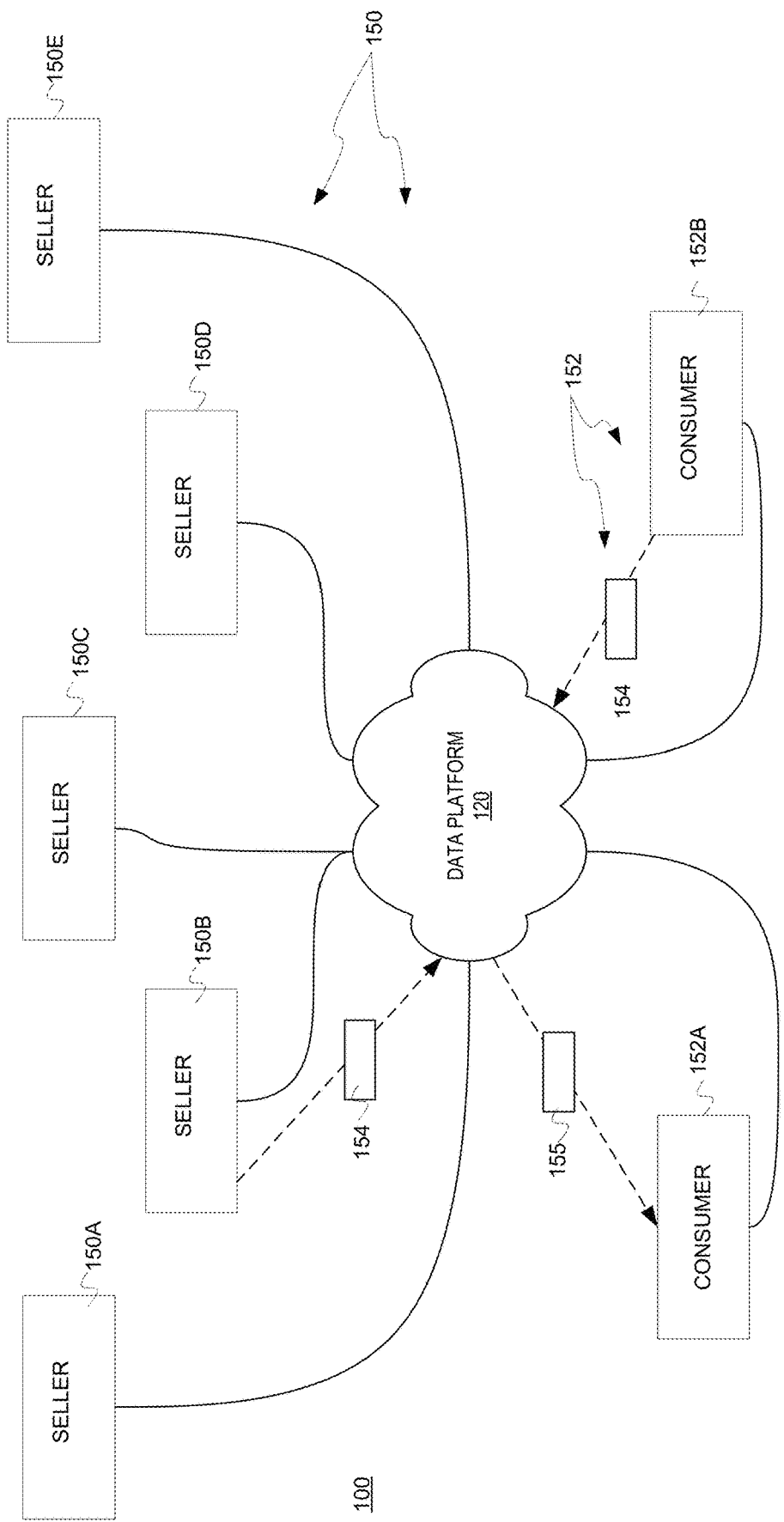
FIG. 2 further illustrates portions of the system of FIG. 1 in accordance with an illustrative embodiment.

FIG. 2 further illustrates portions of the system 100 of FIG. 1 in accordance with an illustrative embodiment. As shown the advertisers 150A-E (jointly advertisers 150) may represent the sources 131 of FIG. 1. The sellers 150 may represent any number of exchanges, platforms, clearinghouses. advertisers, marketers, businesses, retailers, service providers, individuals, organizations, entities, or so forth referred to as sellers 150 or businesses for purposes of simplicity. The consumers 152A, 152B (jointly consumers 152) represent any number of users, consumers, groups, or individuals that have data 154 (also including transactions) that is utilized to allow targeted advertisements 155 to consumers 152 that are willing to allow the sellers 150 access through the data platform 120. In one embodiment, the data platform 120 may represent all or portions of the system 100 of FIG. 1 (including the cloud system 114, servers 116, and databases 118).

The consumers 152 may actively or passively upload data 154 to the data platform 120. The data platform 120 may also receive amended, updated, or add additional data 154 for the consumers 152 at any time as described herein. The consumers 152 may have an agreement (e.g., contract, terms of services, permissions, authorizations, etc.) for the utilization of the data 154 by the sellers 150 or other interested parties to generate the targeted advertisements 155. The agreement or contract may specify how, when, and what portions of the data 154 may be used as well as the associated compensation terms. The agreement may specify that the data 154 may be processed, analyzed, purchased, licensed, rented, leased, or otherwise managed by the data platform 120 for the mutual benefit of the consumers 152 and the sellers 150. For example, the consumer 152B may elect to receive targeted advertisements 154 to support the companies, organizations, entities, or other groups in which the consumer 152B has stock, ownership shares, interests, holdings, or a vested interest. The consumer 152B may be interested in the targeted advertisements 154 to support herself or to support family and friends. In another example, the consumer 152B may elect to license use of their data 154 such that they are compensated utilizing a digital currency (or hard currency) for each access of or utilization of their data 154 by the sellers 150. The data platform 120 may also parse or separate data for utilization.

The data platform 120 may process raw consumer data to generate the targeted advertisements 155. The targeted advertisements 155 may be desirable to the user because the targeted advertisements 155 support the companies, stock, holdings, ownership, or interests of the user. In one embodiment, a term, identifier, or logo utilized with each of the targeted advertisements 155 may indicate that the targeted advertisements 155 are for the benefit of the user. In one embodiment, the targeted advertisement 155 may even include the stock ticker, name of the company, user's name, key word, identifier, certification, or so forth indicating that the targeted advertisement 155 has gone through the analysis, authorization, and vetting process herein described.

The data platform 120 performs valuation of the data 154 and targeted advertisements 155 based on information from any number of sources including current rates, contracts, indices, exchanges, and other applicable information. For example, current targeted advertisement rates may be utilized to value the data 154. The tokens paid to the consumers 152 in exchange for the data 154 may vary based on the volume, quantity, verification, and types of information included in the data 154. The data platform 120 normalizes data monetization for the consumers 152 and sellers 150. Compensation performed by the data platform 120 may be performed utilizing digital currencies or hard currencies. In one embodiment, blockchain-based currencies may be utilized to compensate the consumers 152. Full tokens or partial tokens may be utilized to most accurately represent the values being exchanged. There may be a predefined number of tokens available thereby allowing early adopters of the system 100 to earn more over time. For example, in response to the consumer 152A selling or granting access to the data 154 to the data platform 120 or the seller 150B, the consumer may be compensated with tokens (e.g., Bitcoin, Ethereum, proprietary tokens, etc.). All or portions of the data 154 may be involved in a transaction. For example, in addition to stock, ownership, equities, and interest, the data 154 may include numerous components relating to all aspects of the life, work, hobbies, entertainment, studies, politics, health, family, consumer habits, for the consumer 152B. The consumers 152 may be compensated per transaction, daily, weekly, monthly, yearly, or based on other set intervals, payment thresholds, actions, or so forth.

Not all of the sellers 150 may sell products, goods, or services that correspond to the stocks, holdings, and interests of the consumers 150. The seller 150D may only license rights to temporarily (e.g., for one year) access the consumer habits of the consumer 152B existing and updated in real-time. The exchange for the tokens may include a pointer to a secure storage or vault accessed through the data platform 120. The pointer may be an encryption key, access information, unique identifier, or other security information for accessing the data 154 associated with the user. In another embodiment, security tokens used for the blockchain may also be embedded with the data 154. The tokens granted through the data platform 120 may vary in value, may be fixed, or may act similar to other monetary instruments (e.g., stocks, bonds, certificates of deposit, etc.) for a specified original value of the data 154.

The data platform 120, sellers 150, or consumers 152 may keep and maintain digital ledgers that track the transactions within the system 100 to verify and authenticate the data 154, advertisements 155, and associated transactions. The sellers 150 may utilize the data 154 to advertise, sell, or market goods, services, products, perform market research, generate analytics, and otherwise generate and communicate the advertisements 155 and communicate the advertisements 155 to the consumers 152. As previously noted, the data platform 120 may also represent one or more processing, analysis, blockchain, or distribution centers, systems, devices, facilities, or so forth. The sellers 150 and consumers 152 may represent any number of individuals or groups (e.g., hundreds, thousands, millions, etc.).

As noted, the sellers 150 may send or distribute goods and services associated with the advertisements 155 through the cloud system or directly to the consumers 152. In one embodiment, the seller 150B may distribute goods and services 154 to the consumer 152A through the data platform 120. The data platform 120 may perform distribution of the goods and services 154. For example, the data platform 120 may include any number of physical storages, digital storage, warehousing, and distribution systems, facilities, professionals, employees, contractors, electronics, and so forth.

Figure 3:
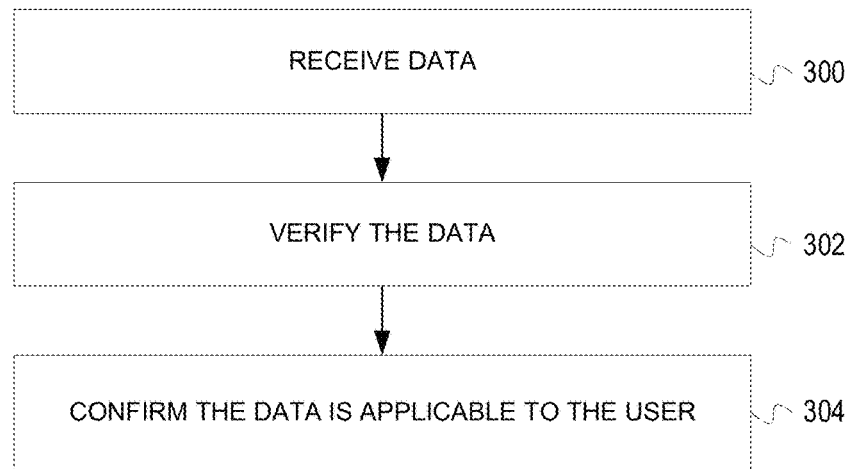
FIG. 3 is a flowchart of a process for receiving data in accordance with an illustrative embodiment.

FIG. 3 is a flowchart of a process for receiving data elements in accordance with an illustrative embodiment. The process of FIGS. 3-6 may be performed by a platform, device, server, or other equipment in accordance with illustrative embodiments (see for example the devices, servers, systems, and equipment of FIG. 1). All or portions of the process of FIGS. 3-6 may be performed automatically. The process of FIG. 3 may be implemented by a system or platform, such as the system 100, data platform 120, or devices 101 of FIG. 1 referred to generically herein as the platform. The steps of FIGS. 3-7 may be combined in any order, integrated, or otherwise combined as useful.

The process of FIG. 3 may begin by receiving data (step 300). The reference to the data elements in FIG. 3 may represent one or more portions of data that are received in a session, simultaneously, sequentially, or concurrently. The data may represent or be referred to as one or more data elements, data components, portions of data, fields, captured information, or so forth. The data may be received through any number of processes, devices, platforms, or so forth. For example, the data s may be received, captured, generated, or retrieved through online, application, or electronic purchases, video selections, point-of-sale, foot traffic, location, surveys, social media selections, web consumption and history, audio input, online activities, actions, selections, or so forth.

Next, the platform verifies the data (step 302). All or portions of the data may be verified individually or as part of a data set in which the data is included. The process of steps 300, 302, 304 may be performed automatically by algorithms, programs, or instructions configured to determine the validity and authenticity of the data. The verification may also be performed utilizing input or feedback from the user. For example, periodically (e.g., hourly, daily, weekly, monthly, yearly, etc.) or based on an activity (e.g., purchase, request, opening an application, opt-in, etc.) the verification may be performed. For example, a use interface may present the data that has been received/captured during step 300 to verify the data in step 302. Secondary processing and verification centers that utilize artificial intelligence, machine learning, human analysts, Next, the platform confirms the data is applicable to the user (step 304). The platform may also receive specific user input to confirm that data belongs to the user or originated from the user or their authorized activities. For example, the user may verify that the data is accurate and resulted from actions, activities, selections, or data of the user. In another example, the user may determine that the data was not received utilizing approved methods or processes. As a result, the data may be deleted or otherwise removed. Unauthorized data may not be incorporated into a larger data set or a data profile associated with the user. The user maintains control over their data and how it is captured, managed, monetized, and otherwise utilized by themselves and third parties.

Figure 4:
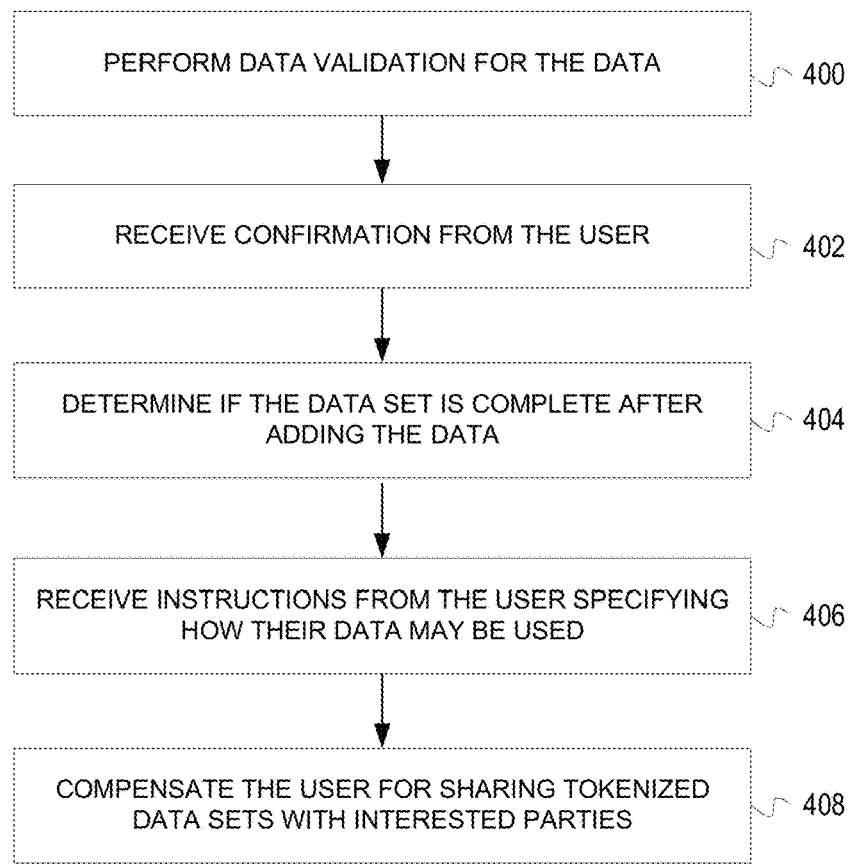
FIG. 4 is a flowchart of a process for utilizing data in accordance with an illustrative embodiment.

FIG. 4 is a flowchart of a process for utilizing data in accordance with an illustrative embodiment. The data referred to in FIG. 4 may be tokenized via block chain for the purpose of authorizing, securing, confirming, valuing, and monetizing data (both consumer and commercial). The process may begin by performing data validation for the data (step 400). In one embodiment, the platform may ensure that the data was received from the user. As is well known, in families and other groups, many users may individually access different wireless and computing devices. For example, devices such as tablets, smart phones, laptops, personal computers (e.g., laptops, desktops, etc.), gaming devices, electronic readers, digital assistants (e.g., Alexa, Siri, Cortana, etc.) and so forth may be utilized by a number of users. During step 400, the platform may verify the user associated with the data. In one example, as data is received, the user may ask a verification question, such as "is this Blair?" The platform may also utilize one or more biometrics to verify the user, such as facial recognition, fingerprint scans, The platform may also utilize machine learning to recognize activities, programs, and behavior associated with each of a number of users that may utilize the electronic devices that are part of or in communication with the platform.

Next, the platform receives confirmation from the user (step 402). Any number of processes may be utilized to perform confirmation. For example, user opt ins, surveys, codes/passwords/pins, biometrics recognition (e.g., facial recognition, fingerprints, etc.), buttons/interface selections, feedback, user input, and other active or passive selections may be utilized to receive confirmation from the user. The user may also be presented with a selection (e.g., pop up, text, soft button, phone call, electronic request, etc.) to confirm data is accurately and correctly associated with them. If not correct, the user may be able to provide more accurate information, such as user, updated data, updated preferences, and so forth. The user may also be able to change data to a different user, delete data, disavow data, or provide extra information that may be useful.

Next, the platform determines if the data set is complete after adding the data (step 404). The platform may compare the data to other data or digital profiles to look for missing, incomplete, or shared data elements or data sets. The platform may receive additional data as automatically searched out or received from the user. The platform may utilize any number of profiles/accounts (e.g., shopping, entertainment, email, business, communication, social media, etc.), devices, or other information to further determine if the data set is correct and update the data associated with the user and utilized by the platform.

Next, the platform receives instructions from the user specifying how their data may be used (step 406). The user may specify how, when, and where their data, compiled data sets, and data profile may be utilized. For example, the granular level of authorization may include individual applications, companies, organizations, entities, and others that may access the data. The instructions may specify the types of advertisements, marketing, or utilization that may be received, such as digital, print, sample products, television, audio, augmented reality, in-application, virtual, holographic, and so forth. For example, the user may specify the types of advertisements that are interesting to user by category, topic, or other information. For example, a first user may initially specify that she is interested in travel deals, wireless service information, college information, and yoga information and products with other updates and expansions permitted over time based on her data. In another example, a second user may specify that he is interested in sports tickets, sporting goods, consumer electronics, business services, and political information without any of the other categories being expanded or added without explicit permission. The instructions may specify how data usage may be limited, capped, or expanded over time automatically or based on the user's permissions. The instructions may also be focused on commercial products and services that may be of interest to the user, such as information technology, medical, healthcare, legal, accounting, consumer goods, industrial goods, manufacturing, shipping/transport, consumables, real estate, utilities, and so forth.

Next, the platform compensates the user for sharing tokenized data sets with interested parties (step 408). The platform monetizes the data to ensure that the user is compensated for the receipt, analysis, processing, and utilization of the data. As previously noted, the user may elect not to receive earnings, payments, or the monetary benefit of the data being monetized. For example, the earnings (e.g., dollars, crypto the, points, credit, discounts, etc.) may be donated, shared, or otherwise distributed to charitable groups, organizations and individuals, and so forth. The user may be compensated periodically, in real-time based on usage of the data sets, based on specific actions (e.g., reaching threshold amounts, user actions, etc.) and so forth.

Figure 5:
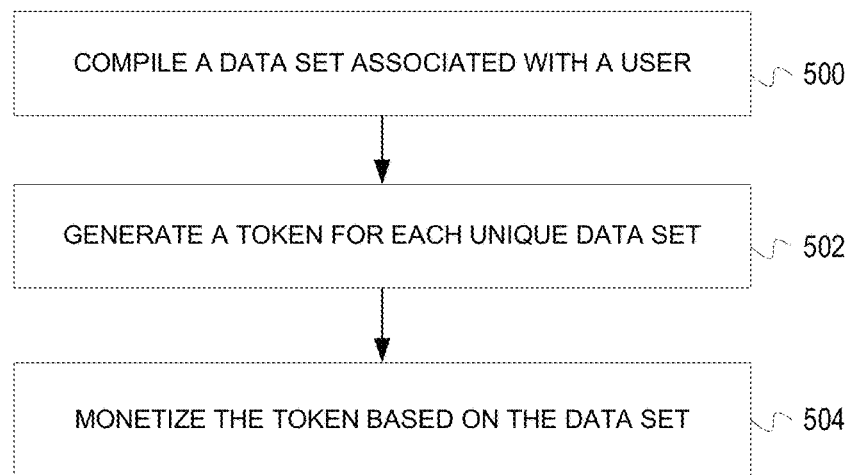
FIG. 5 is a flowchart of a process for monetizing data in accordance with an illustrative embodiment.

FIG. 5 is a flowchart of a process for monetizing data in accordance with an illustrative embodiment. The process may begin by compiling a data set associated with a user (step 500). The platform may have specific requirements for the transition of data into a marketable and monetizable asset. For example, the data may have inherent value that may be improved by clustering distinct sets of data into a data pool. The value of a cluster data pool may be increased as the data pool is cross populated with new distinct data sets that add new data points to the data pool of continually accumulated data sources.

Next, the platform generates a token for each unique data set (step 502). Any number of block chain systems or cryptocurrencies may be utilized to create tokens based on the data. The tokens utilized by the platform may represent cryptographic or digital tokens that manage the access rights to the data as tracked in a distributed ledger. Any number of blockchain systems, platform, and/or software may be utilized. All or portions of the different types of data (e.g., data/information, data sets, data pools, etc.) may be represented by the tokens. In one embodiment, the data sets are inserted or added to the token for utilization. In one embodiment, a smart contract may be created that allows the user's data to be utilized by the platform.

Next, the platform monetizes the token based on the data set (step 504). In one embodiment, the user's data may be monetized by the advertisements or direct offers that are provided to the user through the platform (e.g., advertisements displayed to the user through web browser, applications, tools, etc.). The user may specify the types of products, services, advertisements, and marketing she is willing to receive or is interested in. Advertisers may pay the platform for the right to advertise to the user and the platform (or service provider associated with the platform) may the pay or compensate the user (or the designated party). The users may also be compensated by sharing tokenized and encrypted personally identifiable information (PII). As a result, advertisers and other interested parties may have validated, current, and actionable consumer data points that are highly sought after. The tokens may be utilized by the user to directly control and monetize their data (e.g., web data, application data, profiles, personal measurements, readings, etc.). The user may also be compensated based on purchases of goods, services, equities, or other transactions that result from the data and data collection process. In one embodiment, a user may be compensated for a number of users for which permissions are granted (e.g., organization, entity, etc.).

In one embodiment, the user may be compensated utilizing tokens associated with digital currencies, hard currencies (or conversion from digital currencies into hard currencies), charitable contributions, and tax deductions. The earnings for a user may also be donated, reallocated, or shared between users, entities, and organizations. Users may be rewarded for additional data uploads, updates, additions, confirmations, amendments, surveys/questionnaires completed, and so forth. In many cases, the user may only be required to allow or turn on sharing of data. The tokens may be utilized to perform payments for products, systems, or information/data (e.g., to vendors, stores, third parties, etc.), secure a digital asset, tracking the life of an asset, share a stake in an asset or company, participate in an initial coin offering or subsequent distributions, receive a reward, maintaining and managing a digital asset, make a charitable contributions, receive tax deductions, or other applicable processes. The platform allows the user to select when, how, and what data is captured or otherwise received, as well as how, when, and where the data may be utilized, and how the user is compensated for utilization of their data. The user may change the applicable settings, instructions, configuration, or other applicable information at any time. Any number of bonuses (e.g., utilization, user referrals, longevity, updates, etc.), incentives, or other compensation may be paid by the platform as part of the tokens.

Figure 6:
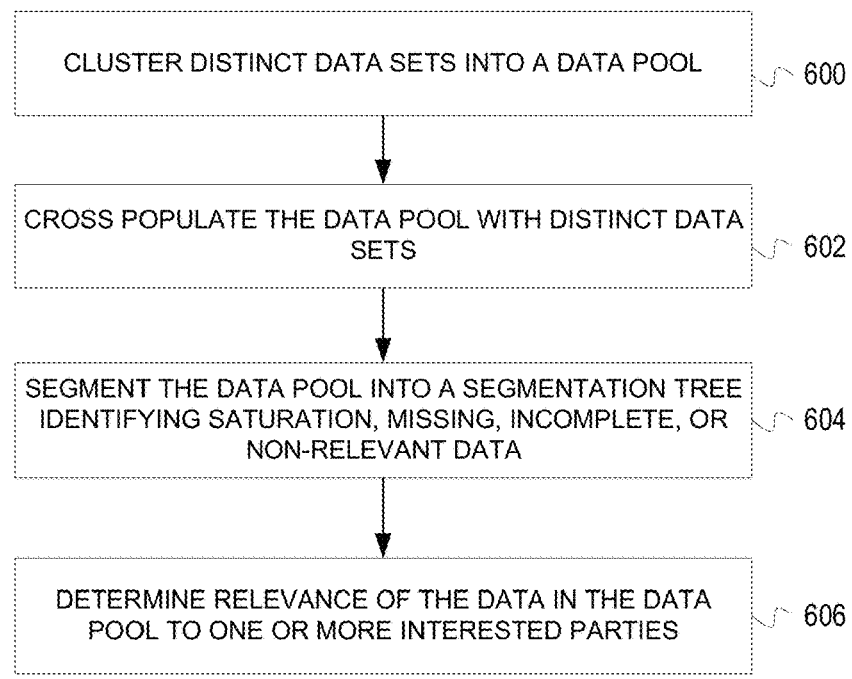
FIG. 6 is a flowchart of a process for data segmentation in accordance with an illustrative embodiment.

FIG. 6 is a flowchart of a process for data segmentation in accordance with an illustrative embodiment. The process may begin by clustering distinct data sets into a data pool (step 600). The data and data sets from similar or distinct types of users, entities, organizations, and groups may be clustered together utilizing any number of grouping, combination, or aggregation parameters (e.g., interests, demographics, advertisements, location, rating, etc.), variables, criteria, or processes. For example, the data pool may be aggregated based on potential targeted advertisements. For example, the users may be pooled because a single advertising or marketing campaign may be focused on all or a substantial portion of the individuals/groups in the data pool. The platform may also validate the data during any of the steps of FIG. 6 utilizing various algorithms to verify the data, associated transaction, contract, records, or other information. Once verified, the platform may combine a single action or transaction into a block of data for a blockchain ledger.

Next, the platform cross populates the data pool with distinct data sets (step 602). As new data is received, the data and associated data sets may be added to a selected data pool (where relevant or applicable). As a result, the data pool becomes more valuable over time. The various parameters, variables, criteria, or processes may be utilized to cross populate the data pool over time or based on actions.

Next, the platform segments the data pool into a segmentation tree identifying saturation, missing, incomplete, or nonrelevant data (step 604). The segmentation tree may represent any number of files, scripts, algorithms, or indications that note potential issues with the data pool. The segmentation tree may be utilized to correct and complete the data increasing the data pool's relevancy to potentially interested parties. As a result, the desirability, valuation, and marketability of the data pool may be increased significantly. The platform may utilize any number of techniques or processes to add, correct, modify, or delete data in the data pool. For example, customized surveys, questionnaires, pop-ups, or requests may be presented to the user.

Next, the platform determines relevance of the data in the data pool to one or more interested parties (step 606). The platform may determine which parties may be most interested in utilizing the data pool, data sets, and individual user data to maximize monetization. For example, the platform may determine that financial companies may be most interested in the data pool based on the types and amount of data. In another example, the platform may determine that medical/pharmaceutical advertisers may be most interested in the data pool. The platform may present the types, amounts, and description of the data pool for the parties to self-select who may be interested. Interested parties may license, bid for, purchase, or access the data pool. The platform may control whether the data is moved to other devices, systems, and platforms or whether it remains on the platform.

Figure 7:
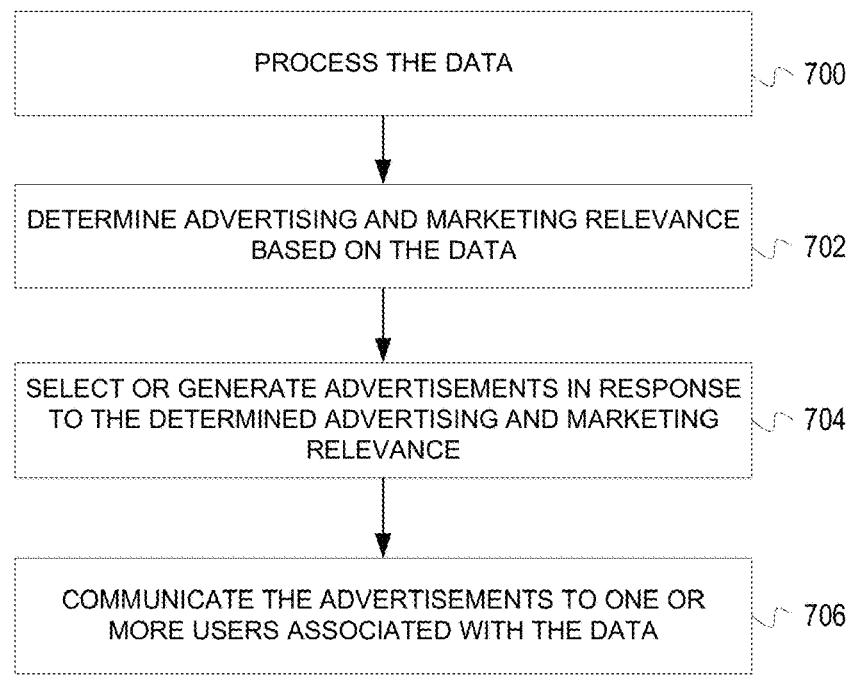
FIG. 7 is a flowchart of a process for utilizing data in accordance with an illustrative embodiment.

FIG. 7 is a flowchart of a process for utilizing data in accordance with an illustrative embodiment. The process may begin by processing data (step 700). The data may represent one or more individual pieces of data, user profiles, data sets, data pools, partitions of data, or so forth. The data may be applicable to one or more users, families, collections, groups, companies, entities, or so forth. The data may be processed, parsed, and analyzed utilizing artificial intelligence, machine learning, advertising analysts, or any number of processes, criteria, or so forth.

Next, the platform determines advertising and marketing relevance based on the data (step 702). The platform may utilize the data to determine relevant goods or services (e.g., consumer, commercial, etc.). In one embodiment, the data may be automatically processed into groups that may have similar views, needs, wants, profiles, or so forth. In another embodiment, the advertising and marketing relevance may be performed for different portions of the data. The advertising and marketing may include advertising and marketing materials in any number of formats, offers, discounts, coupons, deals, or so forth.

Next, the platform selects or generates advertisements in response to the determined advertising and marketing relevance (step 704). The platform may select from available advertisements. In another embodiment, the platform may generate advertisements that are custom created for one or more users. In one embodiment, the platform may self-reference the data to select from available advertisements. The platform may also self-reference the data to create advertisements.

Next, the platform communicates the advertisements to one or more users associated with the data (step 706). The advertisements may be communicated digitally/electronically, physically, or in any number of other existing or developing formats or mediums.

Any number of preparatory steps may be performed as part of the processes of FIGS. 3-7. For example, a user profile may be created for a user. The user profile may be generated or determined from already available information for the user. For example, the user profile may represent one or more profiles compiled by devices, accounts, services, or so forth. The user may provide answers utilizing one or more surveys, fields, questions, or other applicable information and data to determine applicable information and data.

The platform may perform data reconciliation of the information at any time during the process. In one embodiment, a data reconciliation engine may review the applicable information to determine products/services that align with the data and interests of the user. In one embodiment, the platform may determine a portfolio of potential advertisements for goods and services associated with the user's data or interests. As a result, the advertisements may be readily available in real-time or near real-time.

Likewise, at any time the platform may create targeted advertisements based on the user data. The targeted advertisements may represent any number of advertisements displayed to the user including Internet advertisements, in-application advertisements, television/video/Internet Protocol Television advertisements, radio/Internet radio, print advertisements, and other forms of advertisements. In one embodiment In one embodiment, advertising and marketing may be directed toward the user in response to a selection made by the user to opt-in to targeted advertisements that benefit the user's interests rather than random advertisements. For example, the selection may involve the acceptance of financial or legal language utilizing a graphical user interface presented utilizing a web interface, mobile application, or so forth. The selection may be to receive targeted advertisements rather than generic advertisements or advertisements that are not associated with the user's data and interests. In one embodiment, a profile associated with the platform may specify the companies, organizations, entities, or other groups that the user would like to support. The user's profile may also include any number of settings, configurations, parameters, selections, releases, authorizations, verification requirements, or other information and data that controls how the user's data is utilized in accordance with the illustrative embodiments. The user referenced herein may also refer to one or more individuals, a group of people, an entity, an organization, associated persons, or so forth. The data may also be referred to as personal data, consumer data, private data, monetized data, authorized data, advertising data, or marketing data and may include individual data units, data sets, data pools, and other amalgamations or compilations of data, values, and information.

The illustrative embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible or non-transitory medium of expression having computer usable program code embodied in the medium. The described embodiments may be provided as a computer program product, or software, that may include a machine-readable medium having stored thereon instructions, which may be used to program a computing system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications mediums.

Computer program code for carrying out operations of the embodiments may be written in any combination of one or more programming languages, including an object-oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (e.g., through the Internet using an Internet Service Provider).

Figure 8:
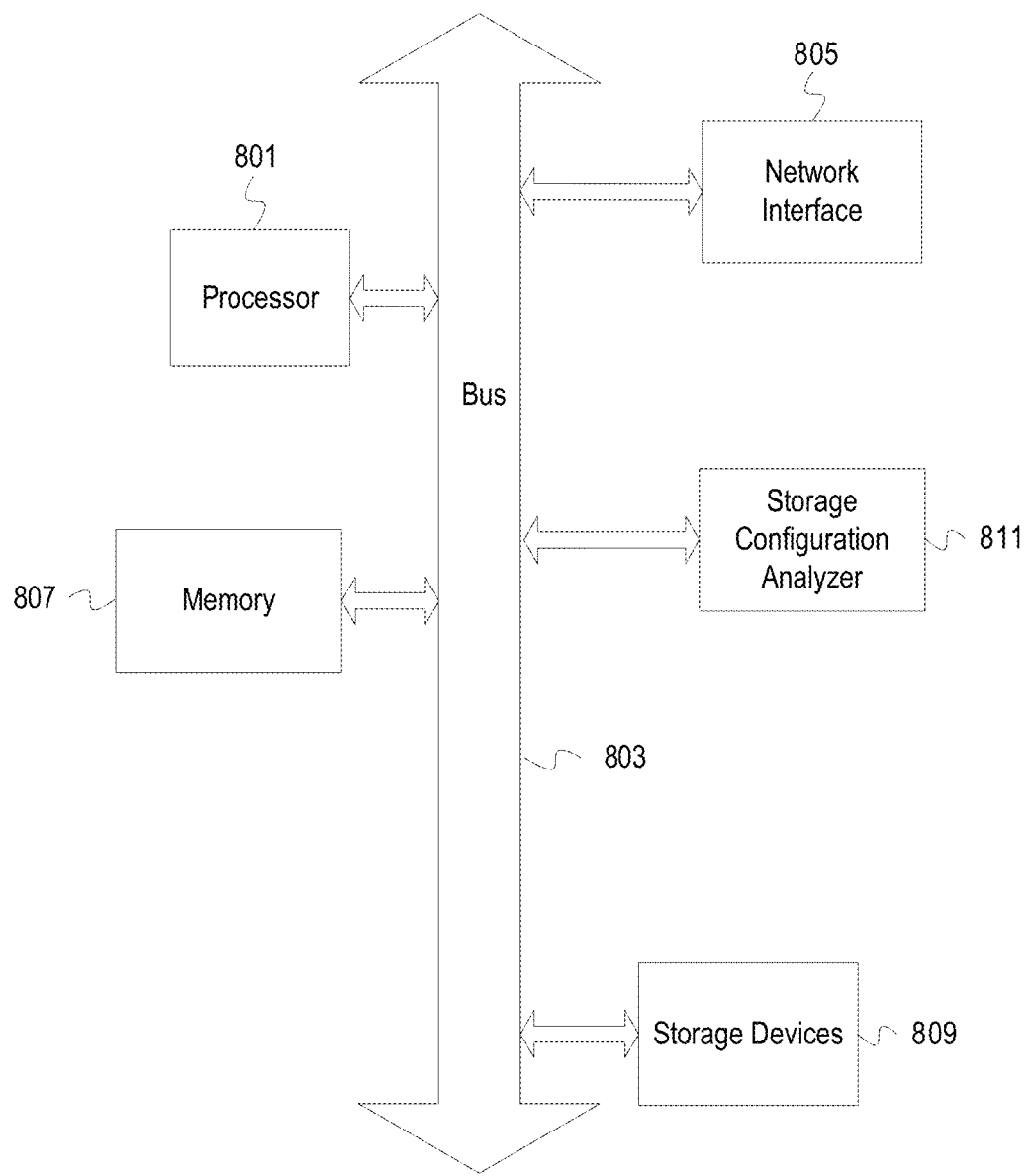
FIG. 8 depicts a computing system in accordance with an illustrative embodiment.

FIG. 8 depicts a computing system 800 in accordance with an illustrative embodiment. For example, the computing system 800 may represent a device, such as one or more of the devices 101 of FIG. 1. The computing system 800 includes a processor unit 801 (possibly including multiple processors, multiple cores, multiple nodes, and/or implementing multi-threading, etc.). The computing system includes memory 807. The memory 807 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media.

The computing system also includes a bus 803 (e.g., PCI, ISA, PCI-Express, HyperTransport®, InfiniBand®, NuBus, etc.), a network interface 805 (e.g., an ATM interface, an Ethernet interface, a Frame Relay interface, SONET interface, wireless interface, etc.), and a storage device(s) 809 (e.g., optical storage, magnetic storage, etc.). The system memory 807 embodies functionality to implement embodiments described above. The system memory 807 may include one or more functionalities that store content, blockchain data, parameters, application, user profiles, and so forth. Code may be implemented in any of the other devices of the computing system 800. Any one of these functionalities may be partially (or entirely) implemented in hardware and/or on the processing unit 801. For example, the functionality may be implemented with an application specific integrated circuit, in logic implemented in the processing unit 801, in a co-processor on a peripheral device or card, etc. Further, realizations may include fewer or additional components not illustrated in FIG. 8 (e.g., video cards, audio cards, additional network interfaces, peripheral devices, etc.). The processor unit 801, the storage device(s) 809, and the network interface 805 are coupled to the bus 803. Although illustrated as being coupled to the bus 803, the memory 807 may be coupled to the processor unit 801.

The illustrative embodiments provide a system, method, platform, and devices that improve the state of the art. In particular, cookies and other forms of data tracking may not be required to track user data. Instead, the user may determine how, when, and where data is shared with one or more groups, entities, or companies. In addition, the user may directly benefit from the shared data. As a result, the user may be incentivized to provide relevant or updated data and information resulting in better advertisements, data utilization, or so forth all with the user's approval. The illustrative embodiments provide embodiments that when considered as a whole are novel and unique over the cited art.

The features, steps, and components of the illustrative embodiments may be combined in any number of ways and are not limited specifically to those described. In particular, the illustrative embodiments contemplate numerous variations in the smart devices and communications described. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of embodiments, processes or methods of the invention. It is understood that any other modifications, substitutions, and/or additions may be made, which are within the intended spirit and scope of the disclosure. For the foregoing, it can be seen that the disclosure accomplishes at least all of the intended objectives.

The previous detailed description is of a small number of embodiments for implementing the invention and is not intended to be limiting in scope. The following claims set forth a number of the embodiments of the invention disclosed with greater particularity.

What is claimed is:

1. A method for managing data, comprising:
   receiving data associated with a user automatically from a plurality of sources;
   automatically confirming the data is applicable to a user;
   adding the data to a data set associated with the user, and
      wherein the data set includes at least two or more of website data, user profiles, and transactions each of which is associated with the user;
   clustering distinct data sets into a data pool;
   cross populating the data pool with distinct data sets:
   segmenting the data set and the data pool to identify saturation, missing, incomplete, or nonrelevant data
   determining whether the data set is complete after adding the data to the data set, wherein the data set is completed based on requirements for the data set and instructions from the user specifying how the data set is usable; and
   creating tokens based on 1) the data set of the user and 2) the data pool, wherein the tokens are blockchain tokens, and wherein the tokens points to the data set associated with the user or the data pool for secure access by one or more parties controlling the tokens.

2. The method of claim 1, further comprising:
   receiving the instructions from the user specifying how the data set is utilized; and
   compensating the user for sharing the tokens with one or more interested parties.

3. The method of claim 1, further comprising:
   requesting additional data in response to determining the data set is incomplete utilizing questions, surveys, and a user profile associated with the user.

4. The method of claim 1, authenticating the data is associated with the user.

5. The method of claim 1, wherein the tokens points to the data set or data pool for secure access by the one or more parties that pay to access the data set or the data pool.

6. The method of claim 1, wherein the data is received in real-time based on the user using the plurality of sources.

7. The method of claim 6, determining relevance of the data pool to one or more interested parties.

8. The method of claim 1, further comprising:
   receiving payments from one or more interested parties to access the data set utilizing the token.

9. The method of claim 8, further comprising:
   compensating one or more users for granting access to the data set, wherein the data set is personal data associated with the user.

10. A system for utilizing data, comprising:
    a plurality of electronic devices executing a data application, the data application is configured to automatically capture the data associated with a user; and
    a data platform accessible by the plurality of electronic devices executing the data application through one or more networks, wherein the data platform automatically receives data associated with the user from the plurality of electronic devices, automatically confirms the data is applicable to the user, adds the data to a data set associated with the user, determines whether the data set is complete based on requirements for the data set after adding the data to the data set, and creates one or more tokens based on the data set of the user, wherein the token is a blockchain token, wherein the data set includes at least two or more of website data, user profiles, and transactions associated with the user, wherein the token points to the data set associated with the user for secure access by one or more parties controlling the token, wherein the data platform clusters distinct data sets into a data pool, cross-populates the data pool with distinct data sets, and segments the data pool to identify saturation, missing, incomplete, or nonrelevant data.

11. The system of claim 10, wherein the token is a block chain crypto token, and wherein the token points to the data set for secure access by the one or more parties that pay to access the data set.

12. The system of claim 10, wherein the data is received in real-time based on the user using the plurality of sources.

13. The system of claim 12, wherein the data platform further determines relevance of the data pool to one or more interested parties, receives payments from the one or more interested parties to access the data set, and compensates the user for the data set, wherein the data set is personal data of the user.

14. The system of claim 10, wherein one or more of the plurality of electronic devices receive additional data to complete the data set in response to determining the data set is not complete.

15. The system of claim 14, wherein the additional data is received in response to a survey, question, or request made through the data application.

16. A data platform, comprising:
a processor for executing a set of instructions;
a memory for storing the set of instructions, wherein the instructions are executed to:
receive data associated with a user automatically from one of a plurality of sources, automatically confirm the data is applicable to the user, add the data to a data set associated with the user, determine whether the data set is complete after adding the data to the data set, wherein the data set is completed based on requirements for the data set, and create one or more tokens based on the data set of the user, wherein the data set is personal data associated with the user, wherein the token points to the data set associated with the user for secure access by one or more parties controlling the token, wherein the data platform clusters distinct data sets into a data pool, cross-populates the data pool with distinct data sets, and segments the data pool to identify saturation, missing, incomplete, or nonrelevant data.

17. The data platform of claim 16, wherein the token points to the data set for secure access by one or more parties that pay to access the data set.

18. The data platform of claim 16, wherein the data is received in real-time based on the user using the plurality of sources.

19. The data platform of claim 18, wherein the data platform further determines relevance of the data pool to one or more interested parties, receives payments from the one or more interested parties to access the data set, and compensates the user for the data set.

20. The data platform of claim 16, wherein the instructions are further executed to receive additional data to complete the data set in response to determining the data set is not complete.

* * * * *